March 1, 1932.   E. LEVAY   1,847,120
AIRPLANE PROPELLER
Filed Oct. 10, 1930   2 Sheets-Sheet 1
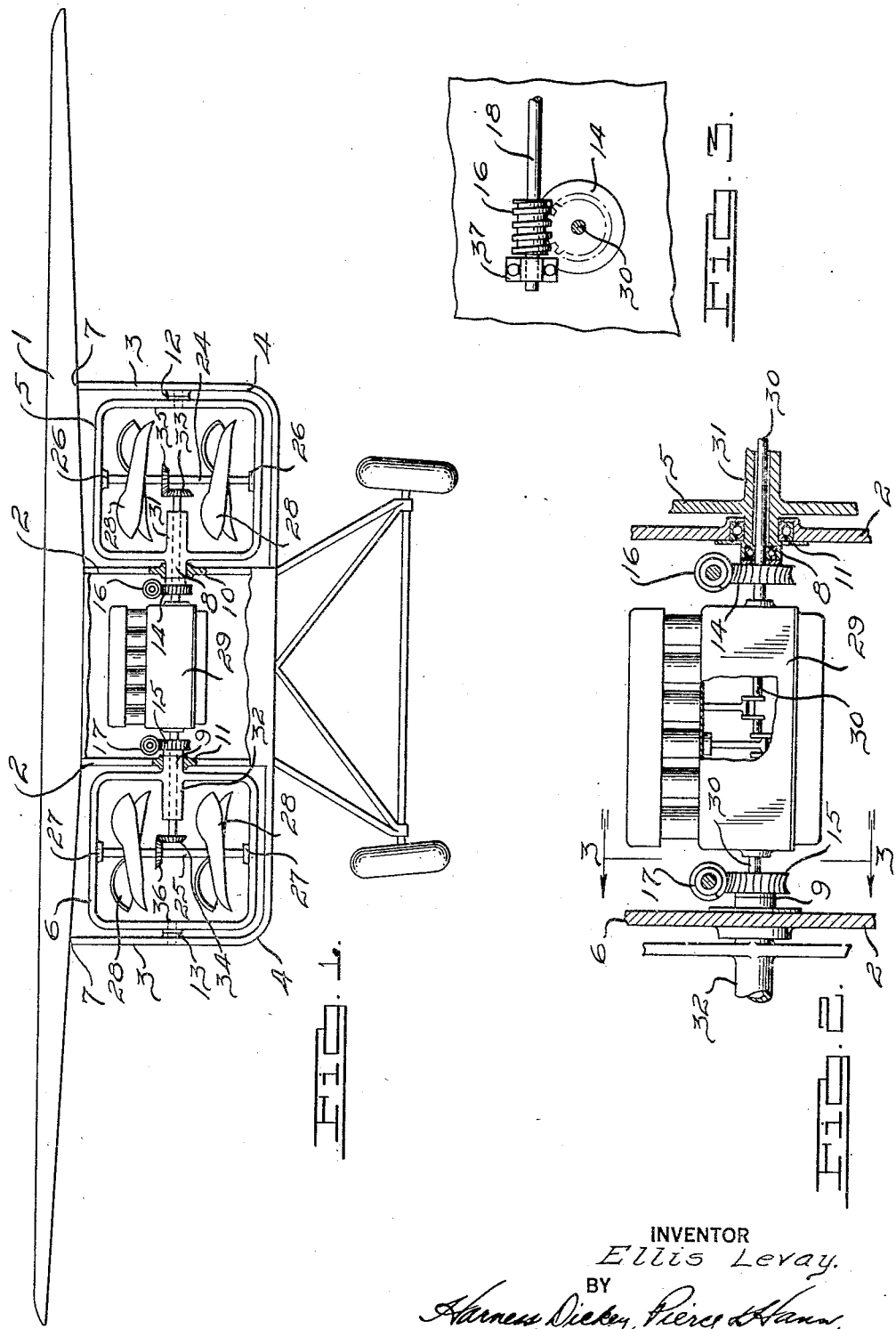
INVENTOR
Ellis Levay.
BY
Harness, Dickey, Pierce & Vann,
ATTORNEYS.

March 1, 1932.　　　E. LEVAY　　　1,847,120
AIRPLANE PROPELLER
Filed Oct. 10, 1930　　2 Sheets-Sheet 2
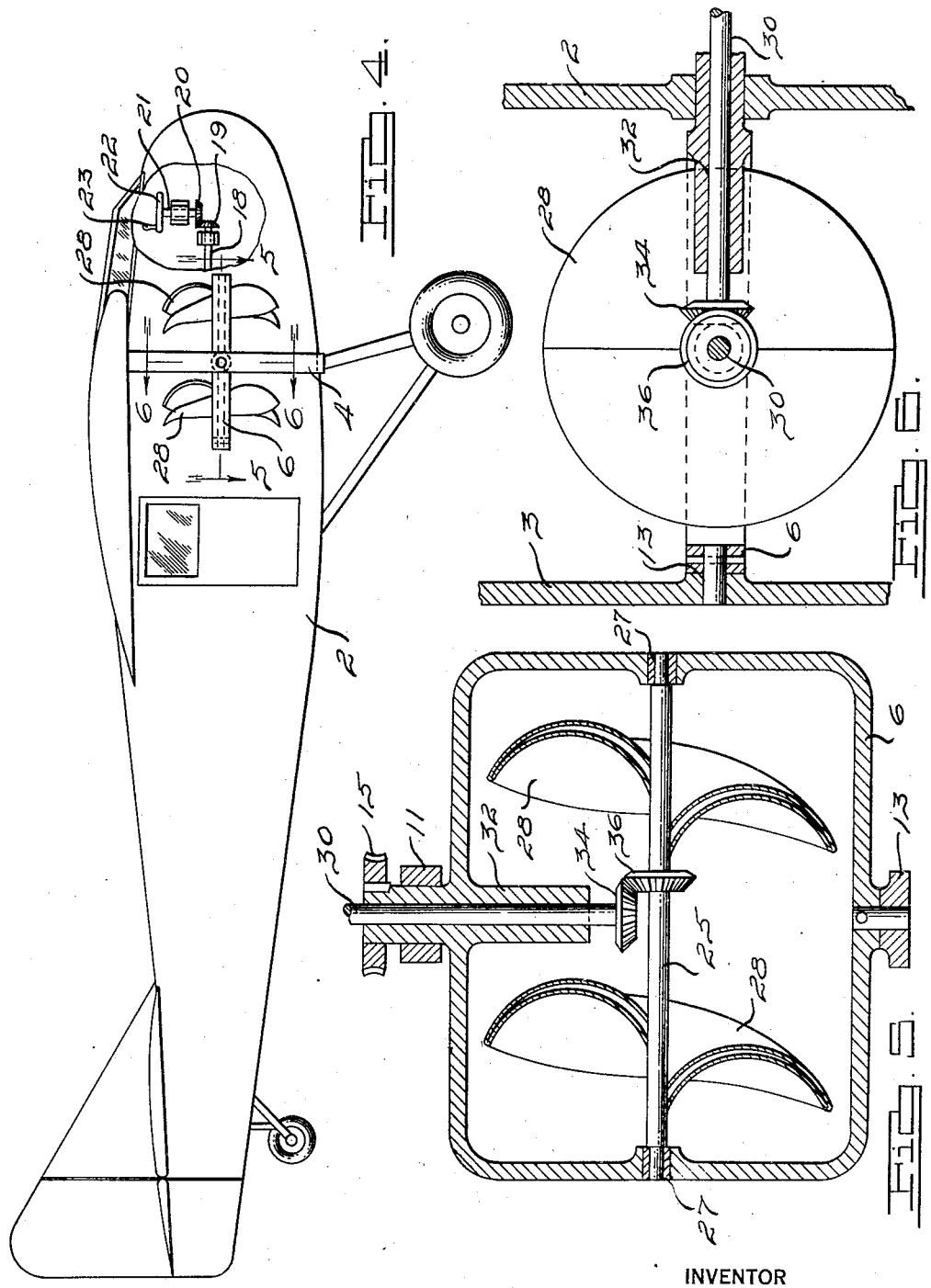
INVENTOR
Ellis Levay.
BY
ATTORNEYS.

Patented Mar. 1, 1932

1,847,120

UNITED STATES PATENT OFFICE

ELLIS LEVAY, OF DETROIT, MICHIGAN

AIRPLANE PROPELLER

Application filed October 10, 1930. Serial No. 487,720.

This invention relates in general to airplanes and more particularly to the type which are designed to rise and descend vertically from the ground.

It is the principal object of the present invention to provide an airplane with a plurality of propeller blades which will act both as a lifting and propelling means.

Other objects and advantages will also appear from a reading of the specification taken in connection with the accompanying drawings, in which—

Fig. 1 is a view in front elevation of an airplane with the front portion thereof broken away showing the power plant and the driving connection between the propeller blades and the power plant.

Fig. 2 is an enlarged view partly in section and partly in elevation showing in detail the power plant and the means for tilting the blades.

Fig. 3 is a view of the gear connection for tilting the blades taken substantially on the line 3—3 of Fig. 2.

Fig. 4 is a view in side elevation of an airplane with certain parts broken away, showing one set of the propeller blades in position for horizontal flight and also showing the manual means for tilting them.

Fig. 5 is an enlarged sectional view taken on the line 5—5 of Fig. 4, looking in the direction indicated.

Fig. 6 is an enlarged sectional view taken on the line 6—6 of Fig. 4 showing one set of propeller blades in top plan view.

Heretofore, it has been the practice to construct helicopters with one or more large lifting screws located somewhere on the upper side of the fuselage adapted to rotate in a horizontal plane. In addition to such construction, it has also been necessary in order to provide forward motion for the helicopter to have a propeller, or propellers, which revolve at right angles to the lifting screws.

The above construction is very cumbersome and the presence of the large lifting screws on the upper side of the fuselage offer considerable resistance to the air when the aircraft is flying in a horizontal direction.

To obviate the above objections in the present type of helicopter, I propose to provide a series of propeller blades which will act both as lifting screws and as forward propelling means.

Referring to the drawings, a laterally extending supporting wing 1 of a monoplane type of airplane is provided with the usual fuselage 2, in this instance, of the cabin type. At points 7 on the underside of the wing 1 and equi-distantly spaced on each side of the fuselage 2 are secured the vertical portions 3 of a frame 4. The frame 4 comprises downwardly extending sides 3 a horizontally disposed cross piece at right angles to the fuselage 2 secured at its medial part to the underside thereof.

Rectangular frames 5 and 6 of identical construction are provided on one side with outwardly extending hubs 8 and 9 respectively which are journaled in bearings 10 and 11 respectively carried on the fuselage 2, and on their opposite sides, the frames 5 and 6 are journaled in bearings 12 and 13 respectively carried on the side pieces 3 of the frame 4. The hubs 8 and 9 extend through the bearings 10 and 11 and are provided with worm gears 14 and 15 respectively having teeth which mesh with worms 16 and 17 respectively secured to the ends of shafts 18, the ends of which are journaled in bearings 37. The shafts 18 each have a bevel gear 19 secured to the opposite ends thereof which mesh with bevel gears 20 secured to the lower ends of vertically positioned shafts 21. The shafts 21 extend into the cock-pit of the airplane and are there provided with control wheels 22. The control wheels 22 have handles 23 for manually rotating them to, in turn, rotate the frames 5 and 6 on their supporting bearings by means of shafts 21 and 18, the gears 19 and 20 and the gears 14 and 16.

Shafts 24 and 25 are journaled in bearings 26 and 27 in the top and bottom sides of the frames 5 and 6 respectively and in the center thereof, each of which carries a series of propeller blades 28 secured thereto in pairs of two or more.

An internal combustion motor or other power plant 29 is secured in the fuselage 2 in any suitable manner. The power plant 29 has a crank shaft 30 which extends from both ends thereof through bearings 31 and 32 formed integral with the frames 5 and 6 with the hubs 8 and 9 thereon. The opposite ends of the crankshaft 30 have bevel gears 33 and 34 secured thereto, which mesh with similar gears 35 and 36 respectively secured to the shafts 24 and 25 respectively.

The surface of each blade 28 is generated by a curved line traveling in a helical path with one end remaining on the axis of the helix, such shape being for the purpose of providing the greatest possible active propelling surface.

The operation of my improved device is as follows. With the power plant in operation, the crankshaft 30 will rotate through the bearings 31 and 32 to, in turn, rotate the shafts 24 and 25 which will rotate the propeller blades 28. It is to be noted that the two sets of propeller blades 28 will rotate in a direction opposite to each other, that is, the set which is positioned in the frame 5 will rotate oppositely from the set in the frame 6. Such operation gives the correct balance to the airplane and permits an even keel to be maintained, for propelling the airplane in a straight line.

Should the pilot find it necessary or desirable to ascend in a vertical plane relative to the ground surface, he will rotate the frames 5 and 6 to bring the blades 28 to a vertical position, as shown in Fig. 1, by revolving the hand wheels 22 in the cockpit of the airplane.

When the airplane has been raised to a desired height the frames 5 and 6 are then rotated forwardly 90° on their respective axes to the position shown in Fig. 4 of the drawings. When the propellers are in this position, the airplane will have horizontal flight in the usual and normal manner of airplanes now commonly in use.

When it is desired to descend in a substantially vertical plane, the frames 5 and 6 are rotated back substantially 90° to bring the shafts of the propellers to a vertical position, the power applied to the propellers cut down, and as the speed of the plane decreases it will descend in a substantially vertical direction by maintaining just sufficient speed on the propellers to keep the plane from striking the ground with sufficient force to injure it.

If it is desired to quickly check the speed of the plane, the frames 5 and 6 are revolved 180° from the position shown in Fig. 4 of the drawings, and power is applied, thus acting as a very quick and effective brake for stopping forward movement of the plane. This can be done either in the air or upon landing on the ground where the landing is made in the usual long glide. If the landing is made in this latter manner, as soon as contact is made with the ground, the frames are rotated so that the propellers act in a rearward direction and thus quickly stop the plane from rolling on the ground.

If during flight of the plane, it is desired to travel both forward and upward with great speed, the frames are adjusted half way between horizontal and vertical, or at any other desired angle, thus giving upward lift and forward propulsion to the airplane.

It will be seen by the present invention that means have been provided whereby the same set of propeller blades which drive the airship forward will also operate to raise or lower it in a vertical plane as desired thus eliminating the use of two separate and distinct sets of propeller blades for this purpose.

It will also be apparent that the invention as shown and described is susceptible of numerous changes and modifications without departing from the spirit or scope thereof which is to be limited only by the appended claims.

Claims:

1. In combination, in an aircraft a substantially rectangular frame rotatable about an axis disposed transversely of the aircraft, a shaft disposed transversely of the axis of rotation of the frame and journaled at opposite ends in opposite sides of the frames, propeller blades secured to the shaft, the propeller blades being disposed entirely within the frame, means for driving the shaft for actuating the propeller blades and independent means for rotating the frame about its axis for purposes of tilting the propeller.

2. In an airplane of the monoplane type, an L shaped frame having one leg secured at one end to the airplane fuselage and projecting laterally therefrom and having the other leg secured at the end thereof to an intermediate portion of the underside of the airplane wing, a substantially rectangular frame secured within the first mentioned frame for rotation about an axis parallel to the wing, a shaft journaled at opposite ends within the ends of the frame, propeller blades secured upon the shaft and being disposed within the rectangular frame, means for rotating the latter mentioned frame and additional means for driving the propeller supporting shaft in various positions of adjustment.

ELLIS LEVAY.